United States Patent
Huggins et al.

(10) Patent No.: US 7,104,306 B2
(45) Date of Patent: Sep. 12, 2006

(54) CAST UNITIZED PRIMARY TRUSS STRUCTURE AND METHOD

(75) Inventors: George L Huggins, Wichita, KS (US); Brian J Meyer, Wichita, KS (US); Lee J Post, Wichita, KS (US); Gordon R Crook, Towanda, KS (US); Scott N Nelson, Derby, KS (US); Stanley T Kampf, Andover, KS (US); Aaron R Heitmann, Mukilteo, WA (US); Hafizullah Wardak, Wichita, KS (US); Daniel J Allison, Wichita, KS (US); Joseph W Camenzind, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/867,417

(22) Filed: Jun. 14, 2004

(65) Prior Publication Data
US 2005/0274485 A1 Dec. 15, 2005

(51) Int. Cl.
*B22D 23/00* (2006.01)
(52) U.S. Cl. .................. 164/47; 164/70.1; 244/54
(58) Field of Classification Search ............... 164/47, 164/70.1; 244/54
See application file for complete search history.

(56) References Cited

U.S. PATENT DOCUMENTS

| | | | | |
|---|---|---|---|---|
| 3,962,763 A | * | 6/1976 | Jury | 29/6.1 |
| 4,612,066 A | * | 9/1986 | Levin et al. | 148/669 |
| 4,757,665 A | * | 7/1988 | Hardigg | 52/782.1 |
| 5,484,120 A | * | 1/1996 | Blakeley et al. | 244/54 |

\* cited by examiner

*Primary Examiner*—Kevin Kerns
*Assistant Examiner*—I.-H. Lin
(74) *Attorney, Agent, or Firm*—Harness Dickey & Pierce P.L.C.

(57) ABSTRACT

A truss structure well suited for use as an engine strut on a commercial aircraft. The truss structure is cast as a single piece integrally formed component from a titanium alloy or another suitably lightweight, structurally strong material. The truss structure includes a plurality of integrally formed attachment structures which enable the truss structure to be secured to an element of an aircraft such as a wing. A plurality of attachment areas for an element such as an engine is also formed that allows the element (e.g. jet engine) to be secured to the truss structure. The truss structure includes a plurality of elongated rails and truss elements that are arranged to provide redundant load paths to ensure that a failure of any one truss element or elongated rail will not result in a failure of the overall truss structure to support whatever load is required.

15 Claims, 3 Drawing Sheets

CAST UNITIZED PRIMARY TRUSS STRUCTURE AND METHOD

FIELD OF THE INVENTION

This invention relates to truss structures and, more particularly to a monolithic, cast truss suitable for forming a primary structure for a mobile platform such as an aircraft.

BACKGROUND OF THE INVENTION

Large cast support structures have traditionally not been used in applications where fail-safe performance of the structure is required. One example of such an application would be in connection with the manufacture of large commercial aircraft. In such instances, large support structures, and particularly large support structures such as engine pylons, have been constructed with a large plurality of independent parts and fastening elements designed so that the failure of any one of the constituent parts does not result in failure of the entire structure. It has generally been believed that a monolithic structural support element, formed from a casting process, is not ideal for use as a primary component of an aircraft because of heretofore recognized inherent limitations with large, cast structures. More particularly, with previously developed large, cast structures, when such structures develop a crack, the crack may propagate through the structure in response to repeated cyclic loading on the structure. Thus, a failure beginning in one element of a large, cast support structure can eventually result in the failure of the entire structure.

Further limitations with large, cast structures involve the weight typically associated with such structures. Until the present time, the manufacture of a monolithic cast structural component has generally been made using steel or aluminum. In aircraft applications, where weight is of paramount importance, casting a large truss-like support structure from steel would yield a component that is simply unacceptably heavy.

Some large structural parts have been cast from aluminum, but aluminum also has drawbacks when attempting to apply it to components to be used with aircraft structures. Most notably, aluminum is not suitable for areas of an aircraft where the component will experience high heat, such as an engine pylon, which experiences significant heat generated by the jet engine.

The use of a large, cast structure as a primary structure on an aircraft would also significantly simplify the construction of modern day commercial aircraft. For example, an engine strut (i.e., pylon) which is used on an aircraft to attach an engine to a wing of the aircraft is typically assembled from a large plurality of independent, complex parts. For commercial aircraft, a typical engine strut is usually composed of a hundred or more independent parts, including various shims, which are held together by thousands of fasteners. The connections require extensive drilling of holes, corrosion protection and sealing of joints and fasteners. The cost of just the engine strut is a significant portion of the total cost of manufacturing an aircraft despite the structure being a relatively small fraction of the aircraft's total mass. Any manufacturing improvement that reduces the overall cost of such an assembly while maintaining a redundant structure that assures against failure, despite the structure being located in an environment of high loading, high sonic fatigue, high temperature, and corrosive gases, would be very desirable. Other examples of such applications might be the carry-through structure used to connect the right and left horizontal tail planes into a single structural assembly, supports for the landing gear, or attachment of fuel tanks or other external equipment to the aircraft (to name a few potential applications).

Accordingly, there is still a need for producing primary structural components for aircraft and other structures that are structurally strong and resistant to structural failure, yet which are lighter than present day structural assemblies. There is a particular need for such structural components that are also capable of handling the high loading, high fatigue, and highly corrosive environments experienced by various structures used in commercial aircraft applications.

SUMMARY OF THE INVENTION

The present invention is directed to a truss structure that is suitable for use in commercial aircraft applications, but is not limited to such applications. The truss structure is cast as a single piece component from a lightweight, yet structurally strong material. In one preferred form the material is a titanium alloy. The truss structure is well suited for use as an engine strut on large commercial aircraft. Since the truss structure creates an integrally formed, single component part, it is more cost effective to produce, and more weight efficient than previously employed engine strut assemblies that involve hundreds of independent component parts held together by thousands of independent fasteners.

The truss structure of the present invention, in one preferred construction, forms an engine strut as explained above. The truss structure includes a plurality of elongated rails. The rails are interconnected by a plurality of truss elements at various points along the rails forming truss nodes. The trusses themselves are interconnected at various truss connecting nodes. The truss structure includes at least one forward engine mounting attachment area integrally formed on the truss structure. At least one aft engine mount attachment area is formed at an aft area of the truss structure. A plurality of wing attachment areas are also formed on the truss structure at spaced apart locations. It will be appreciated that the wing attachment areas and the engine mounting attachment areas are precisely positioned on the truss structure in consideration of the specific type of aircraft that the truss structure will be used with and, in addition, the specific type of engine to be used with the aircraft.

A principal feature of the truss structure is that it is cast from a lightweight material, and in one preferred form from a titanium alloy, as a single piece, integrally formed structure. The elongated rails and truss elements of the structure are further arranged in consideration of the loads that will be experienced by the engine strut during operation of the aircraft, and more specifically to eliminate, or virtually eliminate, the risk of structural failure of the truss structure should one particular truss element develop a crack. Thus, the truss structure is designed to provide redundant load paths to better ensure that if a crack develops in any one particular truss element, the entire truss structure will still remain structurally sound.

The truss structure of the present invention can be used in a wide variety of applications and is therefore not limited to just those involving commercial aircraft. Virtually any application where a large, lightweight, integrally formed truss-like component would be desirable would form a potential application for the truss structure of the present invention.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
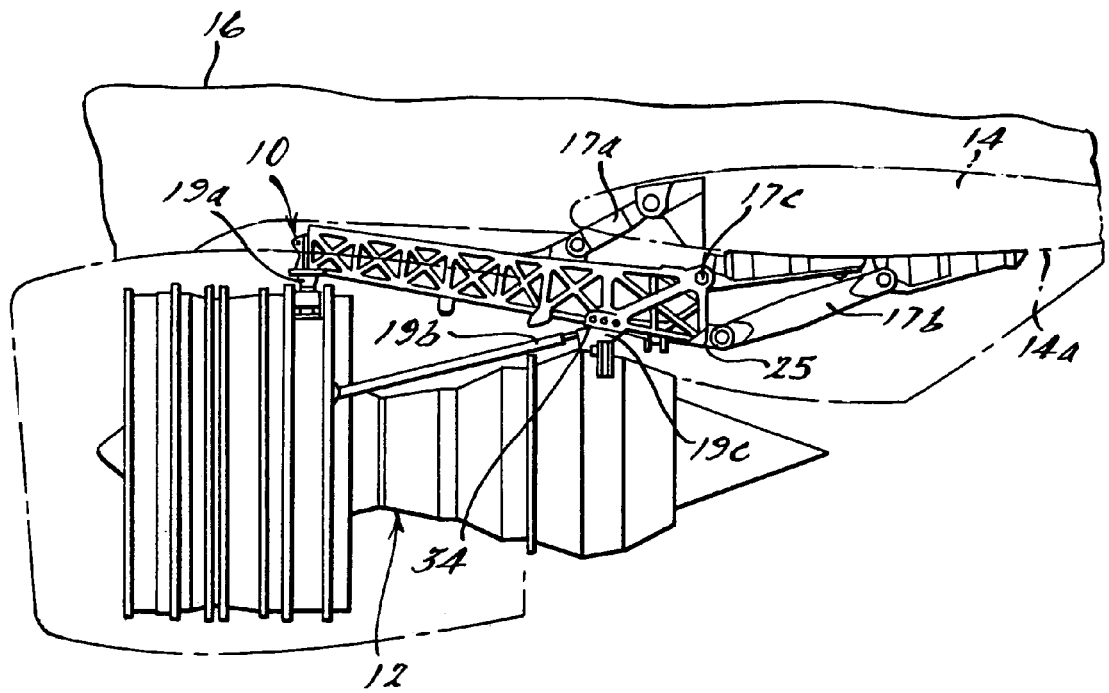
FIG. 1 is a simplified side view illustrating a truss in accordance with the present invention being used to secure a jet engine to an under surface of wing of a commercial aircraft.

Referring to FIG. 1, there is shown a simplified illustration of a truss structure 10 in accordance with a preferred embodiment of the present invention specifically adapted for use as an engine strut or pylon on a commercial aircraft. The truss structure 10, in this example, is used to secure a jet engine 12 to an under surface 14a of a wing 14 of a commercial aircraft 16 via links 17a and 17b. Links 19a, 19b and 19c secure the jet engine 12 to the truss structure 10.

Figure 2:
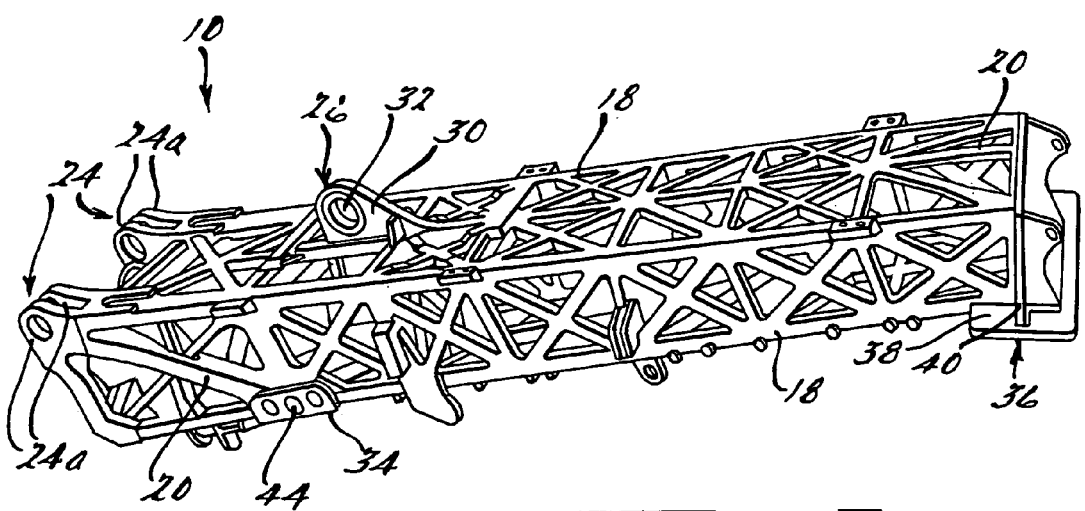
FIG. 2 is a perspective view of a truss structure forming a engine strut in accordance with a preferred embodiment of the present invention.
Figure 3:
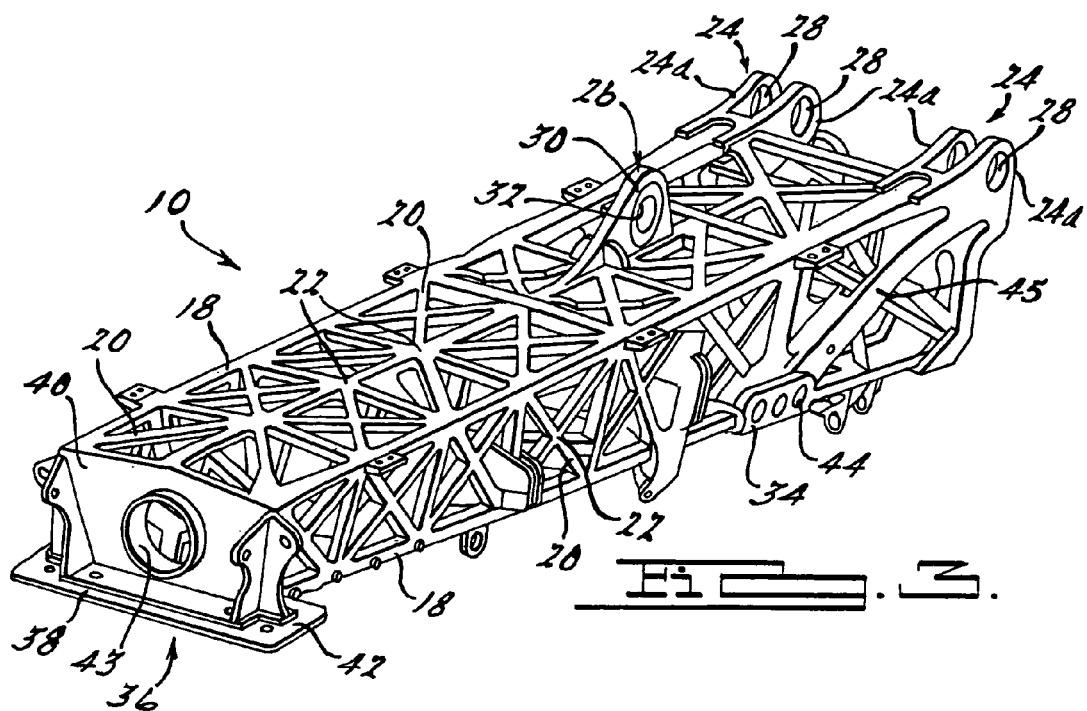
FIG. 3 is a perspective view of the truss structure of FIG. 2.
Figure 4:
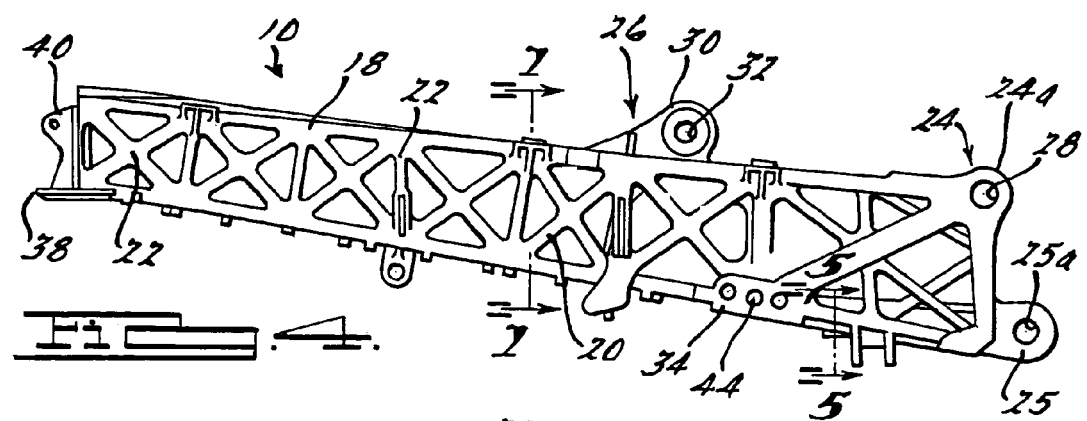
FIG. 4 is a side view of the truss structure of FIGS. 1 and 2.
Figure 5:
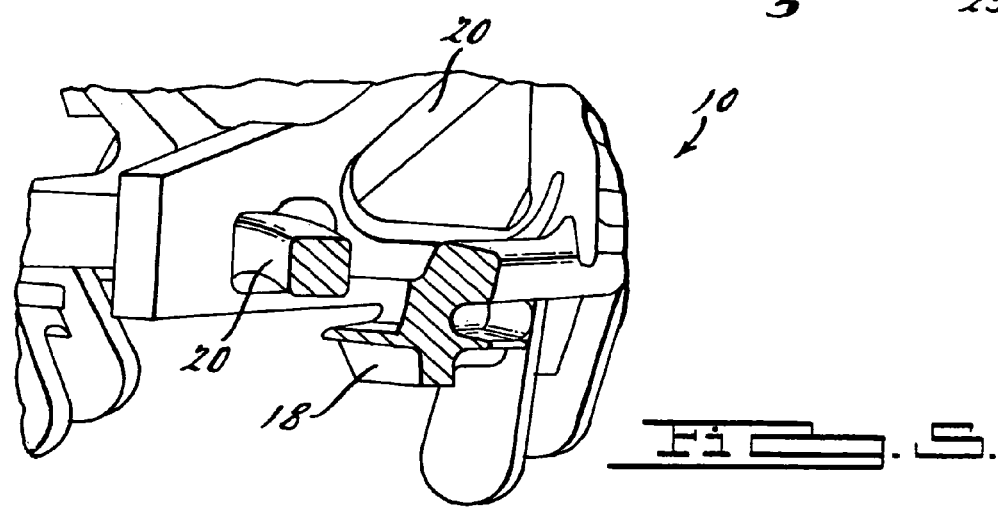
FIG. 5 is a cross-sectional view of a portion of the truss structure of FIG. 3 taken in accordance with section line 5—5 in FIG. 3.
Figure 6:
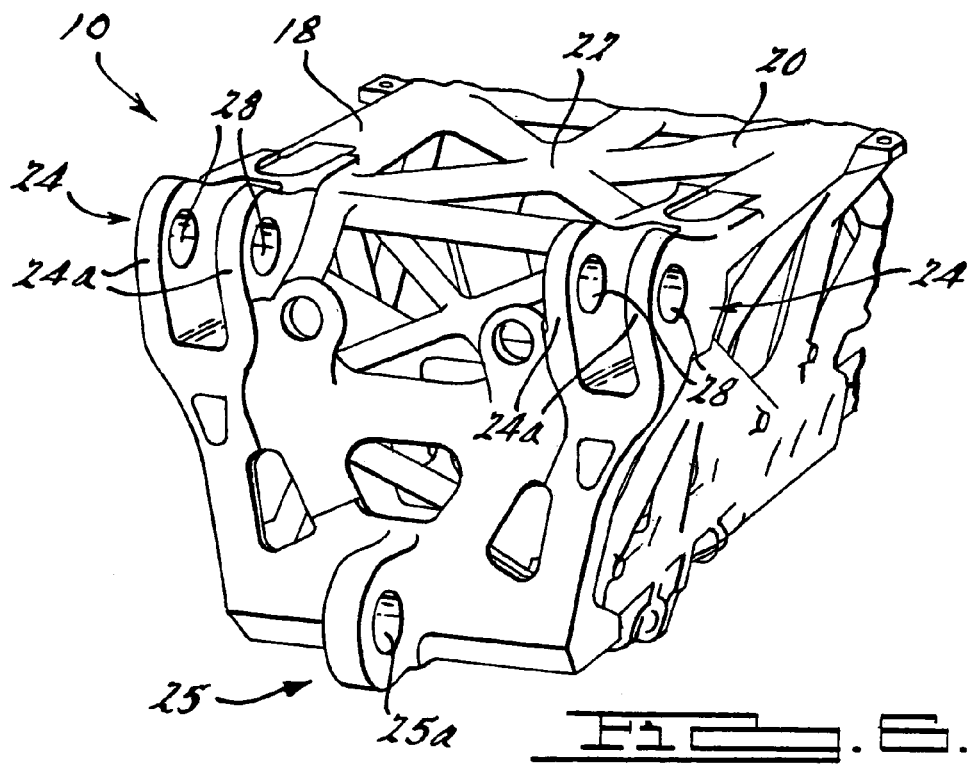
FIG. 6 is a perspective view of just the end of the truss opposite that shown in FIG. 3.

Referring to FIGS. 2–4, the truss structure 10 is shown in greater detail. The truss structure 10 includes a plurality of elongated, tubular rails 18 arranged to form an overall generally rectangular shaped piece when viewed from one end of the truss structure 10. The elongated rails 18 are preferably either circular in cross-section or have a quadrilateral cross-sectional shape with rounded corners to allow easier filling of a casting mold used to form the truss structure 10. However, other cross-sectional shapes for the elongated rails 18 could also be employed.

The elongated rails 18 are intercoupled by a plurality of truss elements 20. Each of the truss elements 20 is similarly preferably formed with a circular cross-sectional shape or a rounded quadrilateral cross-sectional shape to better facilitate molding. The truss elements 20 are further arranged so as to be interconnected at a plurality of truss nodes 22. One or more of the truss nodes 22 can be used to form a "gating" location into which molten titanium material can be injected into the mold used to form the truss structure 10. The molding of the truss structure 10 will be discussed in further detail in the following paragraphs. The interconnection of the truss elements 20 and elongated rails 18 cooperatively form a structurally strong and rigid, single piece component that is also light in weight when compared to similarly sized structures made as built-up assemblies of individual parts. The layout of the truss elements 20 is preferably formed through a computer aided design system and tailored to accommodate the loads that the truss structure 10 will need to support.

A particular advantage of the truss structure 10 is that, when properly designed and sized, if any one truss element 20 or elongated rail 18 should develop a crack, or worse yet break completely through, the entire truss structure 10 will still be capable of supporting the required loads. Rather, the structural integrity of the overall truss structure 10 will not be tangibly reduced or compromised by a crack or a break of any one of the truss elements 20. The truss structure 10 effectively provides redundant load paths that allows the loads experienced by the truss structure 10 to be redistributed through the remaining truss elements 20 in the event one of the truss elements 20 should fail. This advantageous feature makes the truss structure 10 well suited for use as a primary support structure on a commercial aircraft.

Figure 7:
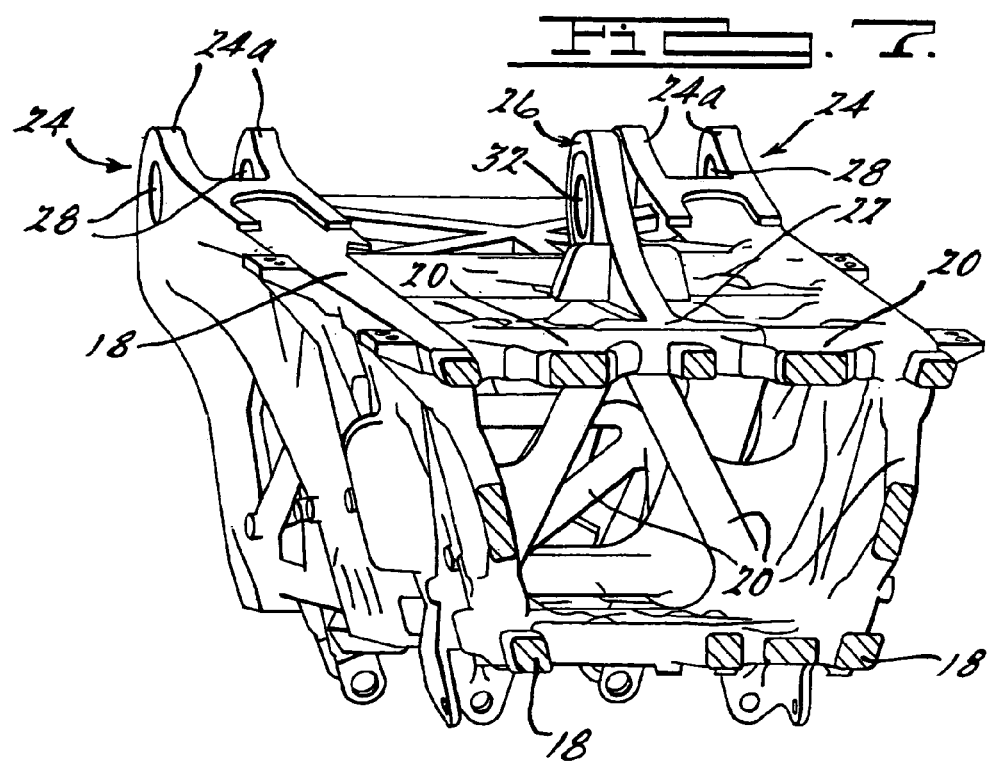
FIG. 7 is a cross-sectional view of a portion of the truss in accordance with section line 7—7 in FIG. 4.

Referring specifically to FIGS. 3, 4 and 7, the truss structure 10 includes forward wing attachment areas 24 and 26. Areas 24 are each comprised of a pair of parallel lugs 24a forming a clevis-like structure, with each of the lugs including a plurality of aligned openings 28 for receiving an external mounting element 17c used to secure the truss structure 10 to the wing 14 (FIG. 1). Wing attachment area 26 is formed by a single lug 30 having an opening 32 which is likewise used for attaching the truss structure 10 to the link 17a that attaches to the leading edge spar of wing 14. A wing attachment area 25, which attaches to link 17b that is attached to the rear of wing 14, and which is shown in FIG. 4, similarly forms a lug having an opening 25a for securing to one end of link 17b.

With further reference to FIGS. 3 and 4, the truss structure 10 also includes an aft engine mount attachment area 34 and a forward engine mount attachment area 36. Forward engine mount attachment area 36 is comprised of plates 38 and 40. Plate 38 includes a plurality of openings 42 for allowing a forward portion of a specific jet engine to be secured thereto, such as via structure 19a in FIG. 1.

Aft engine mount attachment area 34 is formed at one of the truss nodes 22 and includes a plurality of openings 44. While only a single aft engine mount attachment area 34 is illustrated in each of FIGS. 3 and 4, it will be appreciated that the truss structure 10 includes a pair of such areas 34 opposed from one another on opposite sides of the truss structure 10. The aft engine mount attachment areas 34 are used to secure the aft portion of the jet aircraft engine 12 to the truss structure 10, such as via structures 19b and 19c.

The forward mounting areas 36, 38, 42 and 43 of the truss structure 10 carry the majority of the engine inertial loading and a fraction of the engine failure loading during a blade-out event. The aft engine mount attachment areas 34 carry the thrust loads and the remainder of the engine loading and engine failure loading during a blade-out event. This load is transferred through the truss structure 10 to the rear of the truss structure where it is passed onto the wing through the wing mounted attachment areas 24, 25 and 26. It will be appreciated that the truss structure 10, at the aft attachment areas 24, 25 and 26, is subject to high static, dynamic and sonic loading, as well as to elevated temperatures, generated by the jet engine 12 which it is supporting.

It is a principal advantage of the truss structure 10 that it is cast from a lightweight material, preferably from a titanium alloy such as that designated as Ti-6AL-4V. It will be appreciated that there are many other titanium alloys that could also be used within the scope of this invention to suit the particular needs of a specific application of the invention. Titanium is not only light in weight, but is well suited for corrosive environments such as those found in aircraft applications, and even more particularly as support structures for jet engines. As will be appreciated, jet engines generate significant heat, and the support structures used to support jet engines from the wings of an aircraft must be able to tolerate a significant degree of heat without having its structural integrity compromised.

In molding the truss structure 10, a suitable mold is charged with titanium that is heated to a suitable molding temperature. The use of circular or rounded quadrilateral cross-sectional shapes for the truss elements 20 and the elongated rails 18 helps to facilitate rapid filling of the mold and inhibits the tendency towards early solidification of the mold material which might otherwise occur in thinner areas of the components of the truss structure 10. As the molten titanium is allowed to cool and contracts, additional material is fed through the gating locations of the mold to prevent the formation of voids in the titanium material. For the structure illustrated in FIGS. 2–5, the molding process works well with a lessened tendency to develop any sink flaws that might otherwise be present with other cast structures. The use of circular or rounded quadrilateral shaped cross-sections for the truss elements 20 and/or the elongated rails 18 further facilitates modeling of the truss structure 10 with a computer aided design program and the filleting between elements is both easier to model and to cast.

It will be appreciated that post-molding steps includes stripping away ceramic molding material from the truss structure 10, dipping the truss structure in an acid bath to remove surface contaminants, and then performing non-destructive inspection (NDI) of the structure. NDI inspection would involve X-rays for detecting small flaws in the structure, and if any such flaws are found, grinding them out and the resulting depression filled in by welding, and then re-inspecting by further X-rays. The structure 10 would typically then go to a hot isostatic pressure (HIP) chamber where any small voids in the part would be filled in (i.e., healed). Subsequently, the structure 10 would go through a heat treatment to remove any residual stresses and finally a plurality of acid baths to get the casting down to a final weight before shipping. Shot-peening and final machining of various surfaces are also typically required, along with further NDI operations.

Another advantage of forming the truss structure 10 in a single, integrally formed component through a casting process is the ability to place additional material at various points on the structure where needed to account for the inherent variability of the casting process. Subsequent machining operations, such as drilling of holes, or otherwise machining out a precise geometry needed for the attachment of mating parts can be easily performed. Since these areas of additional material are localized on the truss structure 10, the extra weight added is small in relation to the overall weight of the truss structure 10.

Still another advantage of casting the truss structure 10 as a single piece component is the ability to place major load bearing elements directly between the interface where the load is applied and the interface where it is reacted. For example, element 45 in FIG. 3 is the primary load transfer element between the applied load at the aft mount (element 44) and where it is reacted at the wing through element 24. This makes for an efficient structure, and also one that is typically more efficient than can be made from a structure comprised of a large plurality of independent, built-up subassembly components.

It will be appreciated that since the truss structure 10 is cast as a single piece component that the time to assemble the truss structure 10 is dramatically reduced over that needed to assemble a conventional engine strut. The need for corrosion protection to be applied to the large plurality of independent components of a conventional engine strut is also eliminated with the truss structure 10. In addition, there are significantly fewer machining operations required on the truss structure 10, such as drilling and sealing of various subcomponents that are typically required with a conventional engine strut made of a large plurality of independent components.

Still other important advantages of the truss structure 10 are excellent inspectability (by X-ray, N-ray, visual and dye penetrant), and improved reparability. The configuration of the truss elements 20 allows all interior elements to be easily reached and seen during repair. Excellent producibility also allows easy internal access and attachment of various tubing and wiring or other components for optimum packaging.

Yet another important advantage of the truss structure 10 is the ease with which the structure facilitates analysis of its various components. Automated structural analysis and sizing using Knowledge Based Engineering (KBE) means that every element of the structure 10 can be analyzed and a full structural integrity check made of each member of the structure. This may be done readily by using a fine mesh finite element model to check stress concentrations at various points on the truss structure 10. A damage tolerance analysis can also be easily accomplished.

The truss structure 10 of the present invention thus forms a lightweight, economically manufactured structural component that is ideally suited for harsh and demanding environments. While the truss structure 10 has been described in connection with a engine strut used on a commercial aircraft, it will be appreciated that the truss structure could just as easily be employed in various other forms of mobile platforms, such as ships, trains, buses, and other airborne vehicles, or even in fixed structural applications where lightweight, structurally strong components are needed.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of creating a truss-like primary support structure as an integrally formed, single piece component for use in an airborne mobile platform, the method comprising:
   providing a mold for receiving a quantity of flowable titanium, the mold being adapted to form a truss-like structure having a plurality of independent, interconnected truss elements and a plurality of nodes where said truss elements intersect, at least one portion enabling the truss-like structure to be secured to a portion of the airborne mobile platform;
   heating a quantity of titanium to a temperature to produce a flowable titanium;
   filling the mold with said flowable titanium;
   allowing the mold to cool; and
   removing the truss-like structure from the mold.

2. The method of claim 1, further comprising forming the truss elements with a circular shaped cross section.

3. The method of claim 1, further comprising forming the truss elements with a rounded, quadrilateral shaped cross section.

4. The method of claim 1, wherein the truss elements are arranged, analyzed and sized with a plurality of spaced apart interconnecting nodes so that a structural integrity of the truss-like structure is not destroyed in the event of a failure of any one of said truss elements.

5. The method of claim 1, wherein the mold is used to form a truss-like structure comprising a strut for securing a jet engine to a wing of an aircraft.

6. A method of creating a truss structure as an integrally formed, single piece component for use as a load supporting component for a mobile platform, the method comprising:
   providing a mold for receiving a quantity of flowable titanium, the mold being adapted to form a monolithic truss structure having a plurality of independent, interconnected truss elements and a plurality of nodes where said truss elements intersect, at least one portion enabling the monolithic truss structure to be secured to a portion of a mobile platform;
   using the mold to selectively form portions of said truss structures with a first thickness and portions with a second thickness that is greater than said first thickness;
   heating a quantity of titanium to a temperature to produce a flowable titanium;
   filling the mold with said flowable titanium;
   allowing the mold to cool;
   removing the monolithic truss structure from the mold; and
   machining the portions of the monolithic truss structure having said second thickness to form structural elements for attaching said monolithic truss structure to said mobile platform and to a component supported from said mobile platform.

7. The method of claim 6, further comprising forming the truss elements with a circular shaped cross section.

8. The method of claim 6, further comprising forming the truss elements with a rounded quadrilateral shaped cross section.

9. The method of claim 6, wherein forming the monolithic truss structure comprises forming at least one portion thereof suitable for enabling the monolithic truss structure to be secured to an aircraft engine.

10. A method for forming a primary aircraft structure suitable for use in constructing a commercial passenger aircraft, the method comprising:
    forming a monolithic truss through a casting process as a single piece component, the truss being formed from a titanium alloy;
    further forming the truss with a plurality of truss elements, the truss elements intersecting at a plurality of nodes, the nodes and truss elements being arranged in a manner that enables a structural integrity of the truss to be maintained in the event of a failure of one of the truss elements; and
    further forming the truss with at least one attachment point suitable for securing the truss to a portion of an aircraft structure.

11. The method of claim 10, further comprising forming the monolithic truss with at least one attachment point for securing to an engine of said aircraft.

12. The method of claim 10, further comprising forming the monolithic truss with dimensions and strength suitable for supporting a jet engine from a wing of said aircraft.

13. The method of claim 10, further comprising forming the truss elements with a rounded quadrilateral shaped cross section.

14. The method of claim 10, further comprising forming the truss elements with a circular shaped cross section.

15. The method of claim 10, further comprising forming the truss from a titanium alloy Ti-6AL-4V.

* * * * *